United States Patent
Sim et al.

(10) Patent No.: US 10,847,773 B2
(45) Date of Patent: Nov. 24, 2020

(54) BATTERY PACK

(71) Applicant: SAMSUNG SDI CO., LTD., Yongin-si (KR)

(72) Inventors: In Bo Sim, Yongin-si (KR); Hyun Kook Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 729 days.

(21) Appl. No.: 15/086,314

(22) Filed: Mar. 31, 2016

(65) Prior Publication Data

US 2017/0062789 A1 Mar. 2, 2017

(30) Foreign Application Priority Data

Aug. 27, 2015 (KR) .................. 10-2015-0120972

(51) Int. Cl.
*H01M 2/20* (2006.01)
*H01M 2/22* (2006.01)

(52) U.S. Cl.
CPC ........... *H01M 2/204* (2013.01); *H01M 2/206* (2013.01)

(58) Field of Classification Search
None
See application file for complete search history.

(56) References Cited

U.S. PATENT DOCUMENTS

| 2011/0159350 A1* | 6/2011 | Ochi | H01M 2/1077 429/159 |
| 2012/0321936 A1* | 12/2012 | Song | H01M 2/105 429/159 |
| 2012/0328908 A1* | 12/2012 | Han | H01M 2/1061 429/7 |
| 2014/0134473 A1* | 5/2014 | Frutschy | H01M 2/202 429/158 |

FOREIGN PATENT DOCUMENTS

| JP | 2012-160339 A | 8/2012 |
| JP | 2014-135204 A | 7/2014 |

* cited by examiner

*Primary Examiner* — Yoshitoshi Takeuchi
(74) *Attorney, Agent, or Firm* — Lee IP Law, P.C.

(57) ABSTRACT

Disclosed is a battery pack, including: a plurality of cells each provided with first and second electrode terminals and arranged such that the plurality of cells overlap in a first direction; and at least one bus bar including a plurality of terminal connection tabs connected with the first electrode terminals or the second electrode terminals of the plurality of cells to electrically connect the plurality of cells, in which the terminal connection tabs are bent at least one time in a region extending to the first electrode terminals or the second electrode terminals of the plurality of cells, thereby improving durability of the battery pack.

20 Claims, 8 Drawing Sheets

BATTERY PACK

CROSS-REFERENCE TO RELATED APPLICATION

Korean Patent Application No. 10-2015-0120972, filed on Aug. 27, 2015, in the Korean Intellectual Property Office, and entitled: "Battery Pack," is incorporated by reference herein in its entirety.

BACKGROUND

1. Field

Exemplary embodiments relate to a battery pack, and more particularly, to a battery pack including a secondary battery.

2. Description of the Related Art

In general, a secondary battery is a battery, which is chargeable and dischargeable to be repeatedly usable. The secondary battery may be charged with solar energy and other new generative energy, as well as with an existing power system, such as a power plant, as an energy source. The secondary battery may be used as an energy source for a vehicle or large equipment requiring a supply of power, as well as for a mobile phone, a notebook computer, or a camcorder.

SUMMARY

An exemplary embodiment provides a battery pack, including: a plurality of cells, each provided with first and second electrode terminals and arranged such that the plurality of cells overlap in a first direction; and at least one bus bar including a plurality of terminal connection tabs respectively connected with the first electrode terminals or the second electrode terminals of the plurality of cells to electrically connect the plurality of cells.

The terminal connection tab may be bent at least one time in a region extending to the first electrode terminals or the second electrode terminals of the plurality of cells.

The plurality of cells may include a first group of cells arranged in a first column extending in the first direction. The at least one bus bar may include one or more parallel connection bus bars, which include a plurality of the terminal connection tabs bent in a region extending to corresponding electrode terminals of the first group of the plurality of cells, and may connect the first group of the plurality of cells in parallel.

The plurality of cells may include: a first group of the plurality of cells arranged in a first column extended in the first direction; and a second group of the plurality of cells arranged in a second column extended in the first direction next to the first column.

The at least one bus bar may include a serial-parallel connection bus bar, which connects the first group of the plurality of cells and the second group of the plurality of cells in series, in such a manner that the first group of the plurality of cells may be connected to each other in parallel and the second group of the plurality of cells may be connected in parallel.

The serial-parallel connection bus bar may include a plurality of the terminal connection tabs, the plurality of the terminal connection tabs may include: a plurality of first group terminal connection tabs bent in a region extending to corresponding second electrode terminals of the first group of the plurality of cells; and a plurality of second group terminal connection tabs bent in a region extending to corresponding first electrode terminals of the second group of the plurality of cells.

The plurality of the first group terminal connection tabs may be connected with the corresponding second electrode terminals of the first group of the plurality of cells, respectively.

The plurality of the second group terminal connection tabs may be connected with the corresponding first electrode terminals of the second group of the plurality of cells, respectively.

The at least one bus bar may further include one or more parallel connection bus bars, which connect the first electrode terminals of the first group of the plurality of cells to each other and/or connect the second first electrode terminals of the second group of the plurality of cells to each other.

The at least one bus bar may include a bus bar body extending in the first direction. The plurality of terminal connection tabs may extend from a boundary of the bus bar body toward a corresponding terminal surface of the plurality of cells.

The bus bar body may be integrated with the plurality of terminal connection tabs.

The battery pack may further include a reinforcement bar mounted on the bus bar body and including a conductive material different from that of the bus bar body.

The at least one bus bar may include nickel, and the reinforcement bar may include aluminum.

The reinforcement bar may extend in the first direction.

The reinforcement bar may be welded with the bus bar body.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
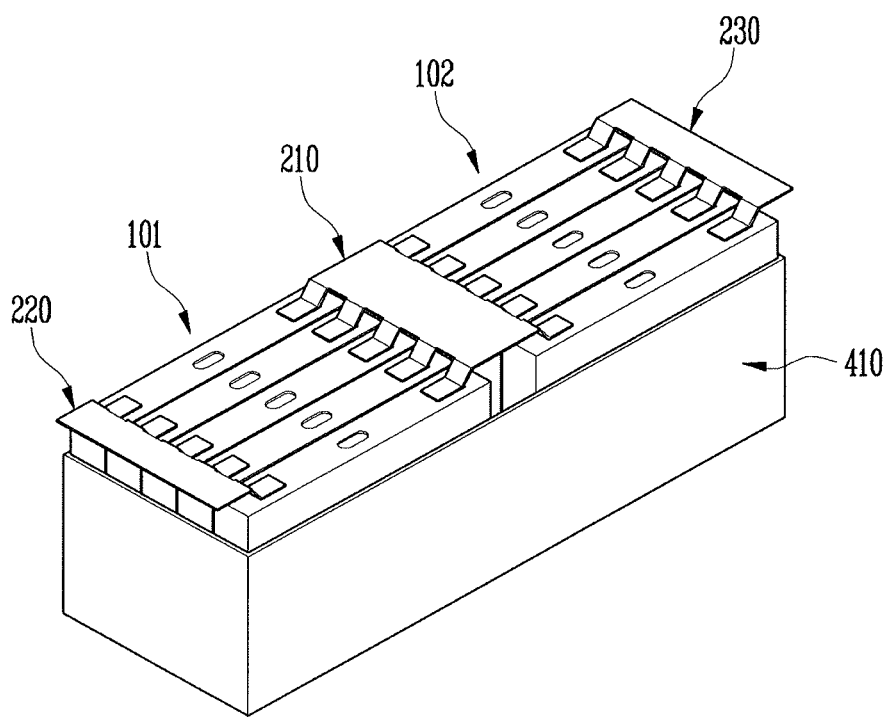
FIG. 1 illustrates a perspective view of a battery pack according to an exemplary embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will also be understood that when a layer is referred to as being "between" two layers, it can be the only layer between the two layers, or one or more intervening layers may also be present.

As used herein, when an element is referred to as "bent," this expression does not limit the configuration to an element formed or shaped by a bending process, but includes any such angled, curved, or similarly shaped configuration created by any suitable process. Additionally, when one constituent element is referred to as being "connected to" another constituent element, one constituent element can be directly coupled to or connected to the other constituent element, but intervening elements may also be present. Further, an irrelevant part may be omitted to clarify the description of the exemplary embodiment and, as long as a battery is capable of being charged or discharged, the battery is acceptable as a secondary battery. Like reference numerals refer to like elements throughout.

The accompanying drawings illustrate a square shaped battery provided with a first electrode terminal and a second electrode terminal, but the shape is not limited thereto. For example, a cylindrical battery provided with a first electrode terminal on one surface and a second electrode terminal on an opposite surface may also be used.

Figure 2:
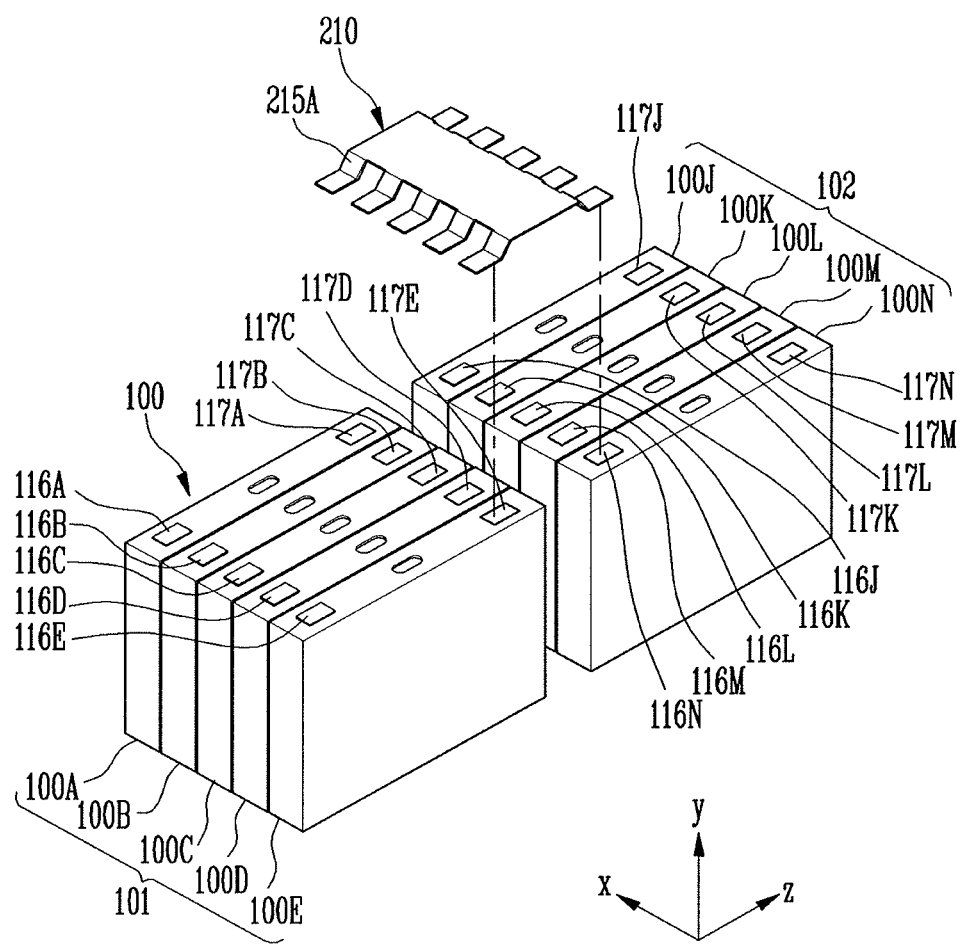
FIG. 2 illustrates an exploded perspective view of the battery pack according the exemplary embodiment of FIG. 1.

A battery pack according to an exemplary embodiment includes a first group 101 of a plurality of cells and a second group 102 of a plurality of cells, one or more bus bars 210, 220, and 230 electrically connecting the plurality of cells, and a battery frame 410 accommodating the plurality of cells. FIGS. 1 and 2 illustrate a case where the plurality of cells are arranged in two columns and are connected in series and in parallel, but the case is illustrative. Embodiments may include the plurality of cells arranged in one column and connected in parallel.

That is, the exemplary embodiments are not limited to a connection state of the plurality of cells described below. Embodiments may include the plurality of cells connected in series, in parallel, and/or in a combination of serial connections and parallel connections.

All of the plurality of cells may be connected in series or in parallel by changing an arrangement of the cells or a connection structure of the bus bar, as necessary. Additionally, the plurality of cells may be divided into a plurality of groups of cells, and the cells of one group may be connected with the cells of another group in series or in parallel, and the cells within one group may be connected in a combination of serial connections and parallel connections, be connected in series, or be connected in parallel.

Each of the first group 101 and the second group 102 of the plurality of cells is a group of a plurality of cells arranged and overlapping in one column. The first group 101 of cells includes first to fifth unit cells 100A, 100B, 100C, 100D, and 100E arranged and overlapping in a first direction. The first to fifth unit cells overlap so that a terminal surface 111 of each of the first to fifth unit cells faces in the same direction. Referring to FIG. 2, the first direction is an X-axis direction.

The second group 102 of cells includes sixth to tenth unit cells 100J, 100K, 100L, 100M, and 100N arranged while overlapping the first direction. The sixth to tenth unit cells overlap so that a terminal surface 111 of each of the sixth to tenth unit cells faces in the same direction, and are disposed so as to face in the same direction as the first to fifth unit cells. The second group 102 of cells is disposed next to the first group 101 of cells. The configuration of each of the first to tenth unit cells is substantially the same.

Figure 3:
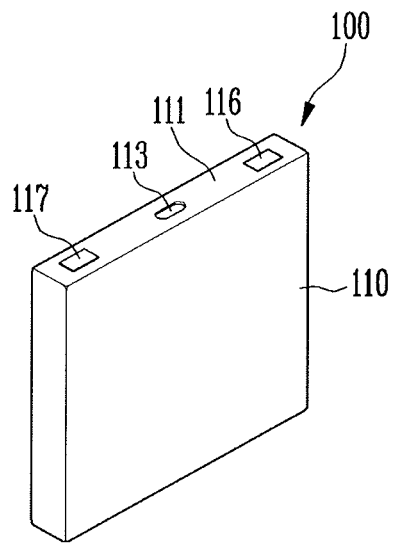
FIG. 3 illustrates a perspective view of a unit cell of the battery pack according the exemplary embodiment of FIG. 1.

The first to tenth unit cells will be described in detail with reference to FIGS. 3 and 4. The first to tenth unit cells are illustrated as a unit cell 100 in FIG. 3. The unit cell 100 is a secondary battery, and is chargeable and dischargeable. In the unit cell, an electrode assembly, in which a separator is interposed between a first electrode and a second electrode, is sealed in a case 110 together with an electrolyte. The electrode assembly may be formed by stacking the first electrode, the separator, and the second electrode, hereinafter, a stack type, or formed by stacking the first electrode, the separator, and the second electrode and then winding the first electrode, the separator, and the second electrode, hereinafter, a winding type. The first electrode and the second electrode have different polarities and, for example, the first electrode may be a positive electrode and the second electrode may be a negative electrode.

Figure 4:
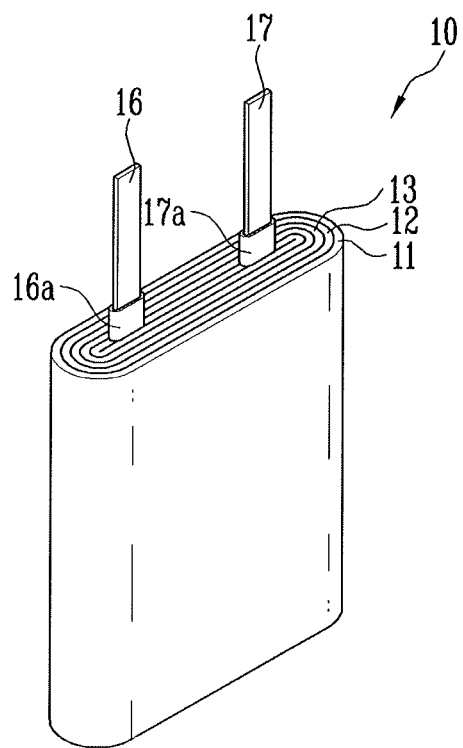
FIG. 4 illustrates a perspective view of an exemplary embodiment of an electrode assembly accommodated in the unit cell of FIG. 3.

FIG. 4 schematically illustrates the winding type electrode assembly as an exemplary embodiment of the electrode assembly. Referring to FIG. 4, an electrode assembly 10 is formed by sequentially stacking and then winding a first electrode plate 11, a separator 12, and a second electrode plate 13. The first electrode plate 11 serves as a first electrode and the second electrode plate 12 serves as a second electrode. Further, the electrode assembly includes a first electrode tab 16 electrically connecting the first electrode plate 11 and a first electrode terminal 116 and a second electrode tab 17 electrically connecting the second electrode plate 13 and a second electrode terminal 117. Insulators 16a and 17a for preventing a short circuit with a different electrode plate are provided at the first electrode tab 16 and the second electrode tab 17, respectively.

FIG. 4 illustrates the winding type electrode assembly, but the electrode assembly may, instead, be the stack type.

The unit cell 100 has a square shape, and the case 110 has a hexahedron shape having a predetermined thickness. Accordingly, a part corresponding to the thickness of the unit cells may be referred to as a boundary formed of four surfaces, and the two remaining surfaces may be referred to as both lateral surfaces. In this case, both lateral surfaces of the unit cell, that is, both lateral surfaces of the case, are surfaces parallel to a stacked surface, in which the first electrode, the separator, and the second electrode of the electrode assembly are sequentially stacked. Further, the first electrode terminal 116 and the second electrode terminal 117 are exposed through one surface of the boundary of the unit cell, that is, the boundary of the case.

The surface, in which the first electrode terminal 116 and the second electrode terminal 117 are exposed, among the surfaces of the case 110 is the terminal surface 111. The terminal surface 111 is one surface of the boundary surfaces of the case, and is the surface in which the first electrode terminal and the second electrode terminal are exposed. The terminal surface 111 may be provided with an exhaust port 113 for discharging gas. The exhaust port 113 may be disposed between the first electrode terminal 116 and the second electrode terminal 117.

As long as a cell is capable of generating electrochemical energy by reacting with an electrolyte, the cell is acceptable as the unit cell 100, and for example, the unit cell 100 may be a lithium polymer cell or a lithium ion cell. A particular configuration of the unit cell is publicly known, thus, a detailed description thereof will be omitted.

Further, in the aforementioned exemplary embodiment, the unit cell provided with the first electrode terminal 116 and the second electrode terminal 117 on one terminal surface 111 has been described, but the unit cell is not limited thereto. Embodiments may include the first electrode terminal and the second electrode terminal provided on different surfaces. Further, in the aforementioned exemplary embodiment, the case where the unit cell has the square shape has been described, but the unit cell is not limited thereto, and a publicly known cylindrical cell may also be used.

In the first group 101 of cells, the first to fifth unit cells 100A, 100B, 100C, 100D, and 100E are arranged in the first direction in a row, such that first electrode terminals 116A, 116B, 116C, 116D, and 116E of the first to fifth unit cells are adjacent to each other and second electrode terminals 117A, 117B, 117C, 117D, and 117E of the first to fifth unit cells are adjacent to each other.

That is, the first electrode terminals 116A, 116B, 116C, 116D, and 116E of the first to fifth unit cells are arranged in the first direction, and the second electrode terminals 117A, 117B, 117C, 117D, and 117E of the first to fifth unit cells are arranged in the first direction.

In the second group 102 of cells, the sixth to tenth unit cells 100J, 100K, 100L, 100M, and 100N are arranged in the first direction in a row, such that first electrode terminals 116J, 116K, 116L, 116M, and 116N of the sixth to tenth unit cells are adjacent to each other and second electrode terminals 117J, 117K, 117L, 117M, and 117N of the sixth to tenth unit cells are adjacent to each other.

That is, the first electrode terminals 116J, 116K, 116L, 116M, and 116N of the sixth to tenth unit cells are arranged in the first direction, and the second electrode terminals 117J, 117K, 117L, 117M, and 117N of the sixth to tenth unit cells are arranged in the first direction.

The battery frame 410 has a hexahedron case with an opened end part which the terminal surfaces of the first to tenth unit cells face. The first group 101 and the second group 102 of cells are accommodated in the battery frame 410 side by side. However, as long as a frame has a shape capable of accommodating and processing the first to tenth unit cells, the frame is acceptable as the battery frame 410.

The one or more bus bars 210, 220, and 230 may connect the first group 101 of cells in parallel, connect the second group 102 of cells in parallel, or connect the first and second groups 101, 102 of cells in series. The one or more bus bars may include a serial-parallel connection bus bar 210 and a pair of parallel connection bus bars 220 and 230.

The one or more bus bars include a conductive material to electrically connect the plurality of cells, and the conductive material may include, for example, a nickel (Ni). The serial-parallel connection bus bar 210 may be an integrated conductive member. Similarly, each of the pair of parallel connection bus bars 220 and 230 may be an integrated conductive member.

The serial-parallel connection bus bar 210 connects the first group 101 of cells and the second group 102 of cells in series. Further, the serial-parallel connection bus bar 210 connects the second electrode terminals 117A, 117B, 117C, 117D, and 117E of the first group 101 of cells to each other, and connects the first electrode terminals 116A, 116B, 116C, 116D, and 116E of the second group 102 of cells to each other.

Figure 5:
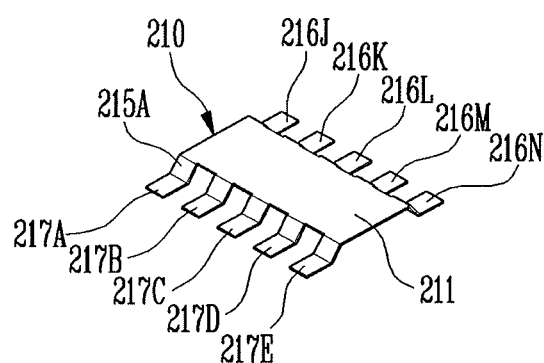
FIG. 5 illustrates a perspective view of a bus bar according to the exemplary embodiment of FIG. 1.
Figure 6:
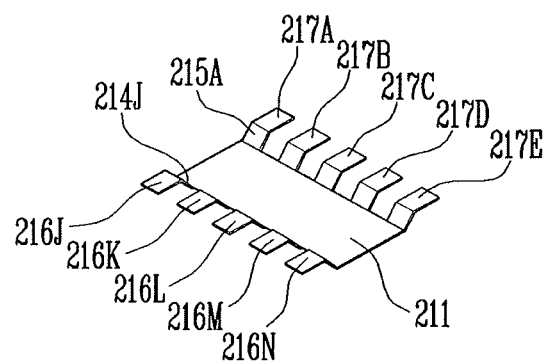
FIG. 6 illustrates a perspective view of an opposite surface of the bus bar of FIG. 5.

Referring to FIGS. 5 and 6, the serial-parallel connection bus bar 210 includes a bus bar body 211 extending in the first direction and a plurality of terminal connection tabs 216J, 216K, 216L, 216M, 216N, and 217A, 217B, 217C, 217D, 217E extending from the boundary of the bus bar body to the terminal surface 111 of the corresponding unit cell.

The bus bar body 211 is a plate body having a predetermined thickness, and a length thereof extended in the first direction may be the same as or larger than a length from the second electrode terminal 117A of the first unit cell to the second electrode terminal 117E of the fifth unit cell. Additionally, the length of the bus bar body 211 extended in the first direction may be the same as or larger than a length from the first electrode terminal 116J of the sixth unit cell to the first electrode terminal 116N of the tenth unit cell. FIG. 1 illustrates the case where the length of the bus bar body 211 extended in the first direction may be the same as the length from the second electrode terminal 117A of the first unit cell to the second electrode terminal 117E of the fifth unit cell or the length from the first electrode terminal 116J of the sixth unit cell to the first electrode terminal 116N of the tenth unit cell, but the length is not limited thereto.

A length of the bus bar body 211 in a width direction refers to a length in a vertical direction to an extension direction in which the bus bar body is extended in the first direction. The length of the bus bar body 211 in the width direction may be larger than intervals between the first group 101 of cells and the second group 102 of cells, and may be smaller than lengths from the second electrode terminals 117A, 117B, 117C, 117D, and 117E of the first group 101 of cells to the first electrode terminals 116J, 116K, 116L, 116M, and 116N of the second group 102 of cells. However, the length is not limited thereto.

The plurality of terminal connection tabs are conductive members extending to the electrode terminals of the corresponding unit cells and connected to the electrode terminals, and has the same thickness as that of the bus bar body 211. The plurality of terminal connection tabs includes five first group terminal connection tabs 217A 217B. 217C, 217D, and 217E connected to the second electrode terminals 117A, 117B. 117C, 117D, and 117E of the first group 101 of cells, respectively, and five second group terminal connection tabs 216J, 216K, 216L, 216M, and 216N connected to the first electrode terminals 116J, 116K, 116L, 116M, and 116N of the second group 102 of cells, respectively.

The bus bar body 211 is disposed between the first group 101 and the second group 102 of cells, and is disposed on the terminal surface 111 of each of the first and second groups 101 and 102 of cells. The first group terminal connection tabs 217A, 217B, 217C, 217D, and 217E extend from the boundary of the bus bar body 211 facing the second electrode terminals of the first group 101 of cells to the corresponding second electrode terminals 117A, 117B, 117C, 117D, and 117E, and the second group terminal connection tabs 216J, 216K, 216L, 216M, and 216N extend from the boundary of the bus bar body 211 facing the first electrode terminals of the second group 102 of cells to the corresponding first electrode terminals 116J, 116K, 116L, 116M, and 116N.

The first group terminal connection tabs may be spaced apart from each other at a predetermined interval, and have the same shape. Accordingly, only the terminal connection tab 217A connected with the second electrode terminal 117A of the first unit cell among the five first group terminal connection tabs will be described in detail.

The first group terminal connection tab 217A extends to the second electrode terminal 117A of the first unit cell and is bent. That is, the first group terminal connection tab 217A extends to the second electrode terminal 117A of the first unit cell, and is then bent at a portion meeting the electrode terminal and then extends substantially parallel to the second electrode terminal 217A. An end portion of the first group terminal connection tab 217A is in contact with a surface of the second electrode terminal 117A of the first unit cell, and is connected with the surface of the second electrode terminal 117A of the first unit cell by welding.

The first group terminal connection tab 217A includes an inclined surface 215A inclined from the boundary of the bus bar body 211 toward the second electrode terminal 117A of the first unit cell. The inclined surface 215A is inclined with respect to the terminal surface 111 of the first unit cell 100A, and is also inclined with respect to the surface of the bus bar body 211. The first group terminal connection tab 217A is bent and extends toward the second electrode terminal 117A of the first unit cell, so that the inclined surface 215A is formed.

In an aspect of the aforementioned configuration, the inclined surface 215A is shaped such that the first group terminal connection tab 217A has elasticity, so that even when an external impact is applied, a connection state by the bus bar 210 may be maintained.

The inclined surface 215A of the first group terminal connection tab is not limited to the illustrated shape, and the first group terminal connection tab 217A may have various shapes having elasticity. For example, the inclined surface 215A may not be an inclined surface having one inclination, but may be formed as a curved surface, in which a cross section is bent at least two times in an "S" shape.

The inclined surface 215A may also be provided at the four remaining first group terminal connection tabs 217B, 217C, 217D, and 217E.

The five second group terminal connection tabs 216J, 216K, 216L, 216M, and 216N may be spaced apart from each other at the same interval as that of the first group terminal connection tabs. The five second group terminal connection tabs extend to the first electrode terminals 116J, 116K, 116L, 116M, and 116N corresponding to the plurality of cells of the second group and are bent. That is, each of the second group terminal connection tabs extend toward the first electrode terminals of the second group of cells, and are then bent at a portion meeting the electrode terminal and then extend substantially parallel to the first electrode terminal.

The five second group terminal connection tabs 216J, 216K, 216L, 216M, and 216N have the same shape. Accordingly, only the second group terminal connection tab 216J connected with the first electrode terminal 116J of the sixth unit cell among the second group terminal connection tabs will be described in detail. The second group terminal connection tab 216J includes an inclined surface 214J inclined from the boundary of the bus bar body 211 toward the first electrode terminal 116J of the sixth unit cell. The inclined surface 214J is inclined with respect to the terminal surface 111 of the sixth unit cell 100J, and is also inclined with respect to the surface of the bus bar body 211. The second group terminal connection tab 216J is bent and extends toward the first electrode terminal 116J of the sixth unit cell, so that the inclined surface 214J is formed.

An end portion of the second group terminal connection tab 216J is in contact with a surface of the first electrode terminal 116J of the sixth unit cell, and is connected with the surface of the first electrode terminal 116J of the sixth unit cell by welding. The inclined surface 214J is shaped such that the second group terminal connection tab 216J has elasticity, and the inclined surface may be modified into various shapes, similar to the first group terminal connection tab 217A.

The pair of parallel connection bus bars 220 and 230 connect the first group 101 of cells to each other in parallel and connect the second group 102 of cells to each other in parallel, respectively. The pair of parallel connection bus bars 220 and 230 include a first parallel connection bus bar 220 connecting the first electrode terminals of the first group 101 of cells to each other, and a second parallel connection bus bar 230 connecting the second electrode terminals of the second group 102 of cells to each other.

The first parallel connection bus bar 220 and the second parallel connection bus bar 230 are the same except that they are connected to different electrode terminals of the unit cells. Particular shapes thereof are the same as a shape of the serial-parallel connection bus bar 210 divided in half in the first direction. However, the pair of parallel connection bus bars 220 and 230 are disposed so that each of the plurality of terminal connection tabs faces the serial-parallel connection bus bar 210.

The first parallel connection bus bar 220 includes a bus bar body extending in the first direction and five terminal connection tabs extending from the boundary of the bus bar body, which faces the first group 101 of cells, to the first electrode terminals 116A, 116B, 116C, 116D, and 116E of each of the first to fifth unit cells and connected thereto.

The second parallel connection bus bar 230 includes a bus bar body extending in the first direction and five terminal connection tabs extending from the boundary of the bus bar body, which faces the plurality of cells 102 of the second group, to the second electrode terminals 117J, 117K, 117L, 117M, and 117N of each of the sixth to tenth unit cells and connected thereto.

A particular shape of the terminal connection tab of each of the first and second parallel connection bus bars is the same as that of the second group terminal connection tab or the first group terminal connection tab of the serial-parallel connection bus bar 210, thus, a detailed description thereof will be omitted.

Further, although not illustrated, the battery pack may further include a spacer, which insulates a space between the unit cells and forms a heat emitting passage, between the unit cells. Further, although not illustrated, the battery pack may further include a control module controlling charging and discharging of the unit cell.

A battery pack according to another exemplary embodiment includes a first group 101 of a plurality of cells and a second group 102 of a plurality of cells, one or more hybrid bus bars 310, 320, and 330 electrically connecting the plurality of cells, and a battery frame 410 accommodating the first and second groups 101 and 102 of the plurality of cells.

The first and second groups 101 and 102 of cells and the battery frame 410 are the same as those of the exemplary embodiment of FIG. 1. The same numerical numbers are assigned thereto, and a detailed description of the first and second groups 101 and 102 of cells and the battery frame 410 will be omitted.

The one or more hybrid bus bars may connect the first group 101 of cells in parallel, connect the second group 102 of cells in parallel, or connect the first group 101 of cells and the second group 102 of cells in series. The one or more hybrid bus bars may include a serial-parallel connection hybrid bus bar 310 and a pair of parallel connection hybrid bus bars 320 and 330.

The one or more hybrid bus bars are bus bars, in which a reinforcement bar is further mounted on the one or more bus bars 210, 220, and 230 of the exemplary embodiment of FIG. 1. The reinforcement bar is a conductive member including a material, which is different from that of the bus bar of the exemplary embodiment of FIG. 1. The serial-parallel connection hybrid bus bar 310 will be described in detail with reference to FIGS. 7 to 10. The serial-parallel connection hybrid bus bar 310 includes the serial-parallel connection bus bar 210 of the exemplary embodiment of FIG. 1 and a reinforcement bar 260 connected to the serial-parallel connection bus bar. The serial-parallel connection bus bar 210 of the exemplary embodiment of FIG. 1 has been described, thus, a detailed description thereof will be omitted.

The reinforcement bar 260 is a plate-shaped body having the same size as that of the bus bar body 211 of the serial-parallel connection bus bar 210, and a thickness thereof may be different from that of the serial-parallel connection bus bar 210. The reinforcement bar 260 is formed of a different material from that of the serial-parallel connection bus bar 210. For example, the serial-parallel connection bus bar 210 may include nickel (Ni), and the reinforcement bar 260 may include aluminum (Al). The reinforcement bar 260 is fixed to an upper surface of the bus bar body 211 of the serial-parallel connection bus bar 210 by welding.

However, as long as a member is formed of a different material from that of the conductive member, serial-parallel connection bus bar 210, and is extended in the first direction, the member is acceptable as the reinforcement bar 260, and the size of the reinforcement bar 260 is not limited to the same size of the bus bar body 211 of the serial-parallel connection bus bar 210. That is, the reinforcement bar 260 may be extended longer or shorter than the serial-parallel connection bus bar 210 in the first direction. Further, the reinforcement bar 260 may be fixed to a lower surface of the bus bar body 211 of the serial-parallel connection bus bar 210, unlike the illustration.

In an aspect of the aforementioned configuration, contact resistance of the bus bar is improved by forming the bus bar from a heterogeneous material.

The pair of parallel connection hybrid bus bars 320 and 330 are bus bars in which a reinforcement bar is connected to each of the pair of parallel connection bus bars 220 and 230 of the exemplary embodiment of FIG. 1. A conductive member having the same size as that of the bus bar body of the parallel connection bus bar and formed of a different material from that of the bus bar body of the parallel connection bus bar is fixed to the bus bar body of the parallel connection bus bar by welding. The reinforcement bar of the pair of parallel connection hybrid bus bars 320 and 330 is substantially the same as the reinforcement bar 260 of the pair of serial-parallel connection hybrid bus bars 310, thus, a detailed description thereof will be omitted.

In the aforementioned exemplary embodiments, the case where the first group 101 of cells and the second group 102 of cells are serially connected to each other, and cells in the first group 101 are connected to each other in parallel and cells in the second group 102 are connected in parallel is illustrated, but the exemplary embodiments are not limited thereto.

Figure 7:
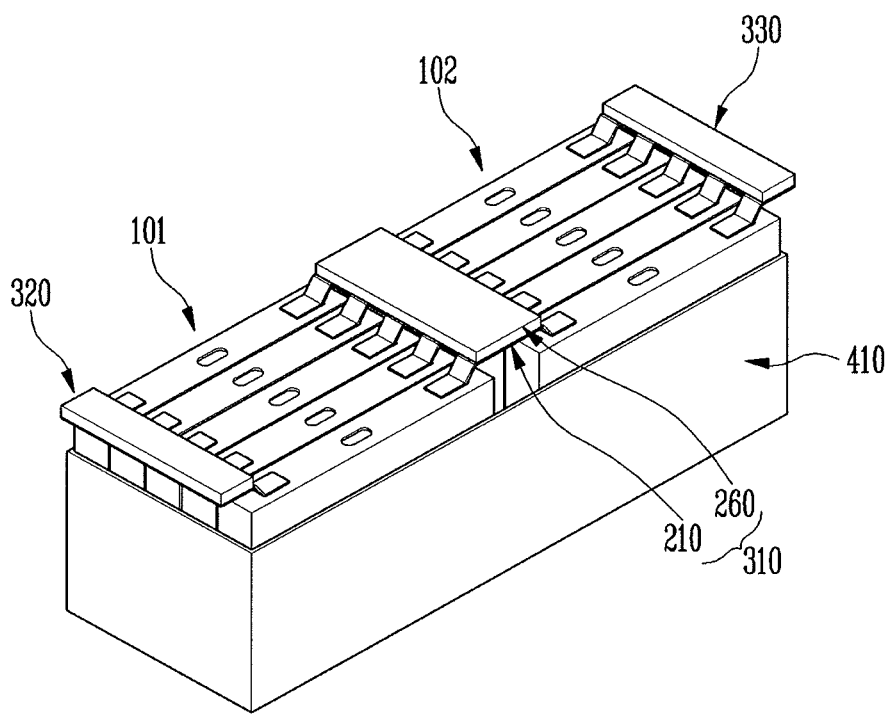
FIG. 7 illustrates a perspective view of a battery pack according to another exemplary embodiment.
Figure 8:
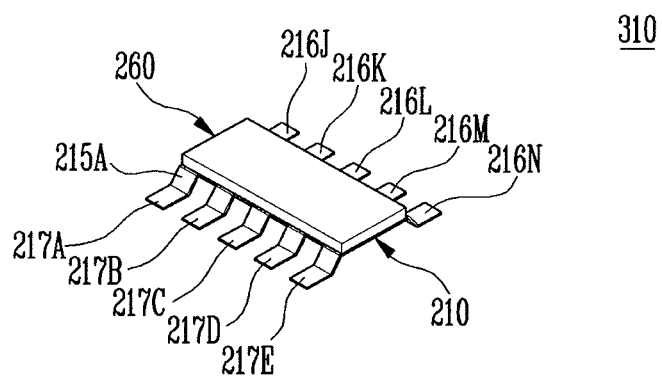
FIG. 8 illustrates a perspective view of a bus bar according to the exemplary embodiment of FIG. 7.
Figure 9:
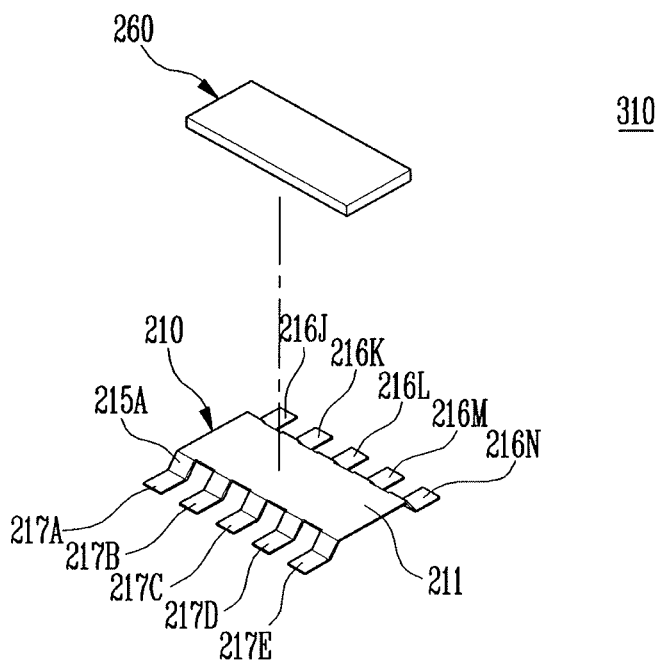
FIG. 9 illustrates an exploded perspective view of the bus bar of FIG. 8.
Figure 10:
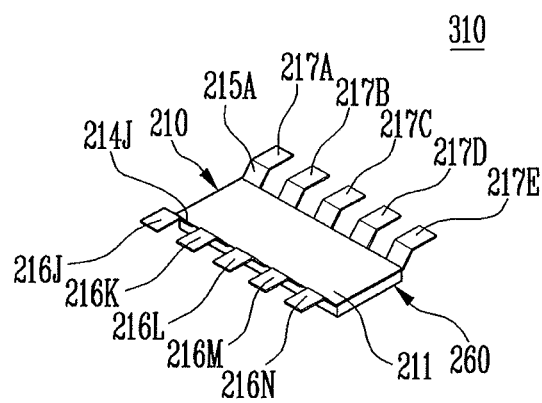
FIG. 10 illustrates a perspective view of an opposite surface of the bus bar of FIG. 8.

As another exemplary embodiment, the first group 101 of cells may also be connected in parallel by the pair of parallel connection bus bars of the exemplary embodiments of FIG. 1 or FIG. 7. That is, the plurality of cells may be connected only in parallel. Further, embodiments may include three or more groups of cells connected to each other in series, and each group of cells connected in parallel.

A battery pack according to yet another exemplary embodiment includes a first, second, third and fourth groups 101, 102, 103, and 104 of cells, serial-parallel connection hybrid bus bars 320 and 330', a parallel connection hybrid bus bar 310, a battery frame 420, a battery housing 450, and a control module 501. A case where the first to fourth groups 101, 102, 103, and 104 of cells are connected in series and in parallel will be described in detail with reference to FIG. 11.

The first to fourth groups of cells are arranged and overlapping in a row in the first direction, and each group of cells are connected in parallel. The first and second groups 101 and 102 of cells are the same as the first and second groups of cells in the exemplary embodiments of FIGS. 1 and 7, such that the same reference numerals are assigned thereto. The third and fourth groups 103 and 104 of cells are arranged in the same manner as that of the first and second groups of cells. The third group 103 of cells is aligned with the first group 101 of cells in a line. The third group 103 of cells is spaced apart from the first group 101 of cells and accommodated in the battery frame 420. The fourth group 104 of cells is aligned with the second group 102 of cells in a line. The fourth group 104 of cells is spaced apart from the second group 102 of cells and accommodated in the battery frame 420.

The first group 101 of cells and the third group 103 of cells are connected to each other in series, such that the first group 101 of cells and the third group 103 of cells do not belong to the same group of cells even though the first and third groups of cells are arranged in the same column. Similarly, the second group 102 of cells and the fourth group 104 of cells are also connected to each other in series, such that the second group 102 and the fourth group 104 of cells do not belong to the same group of cells even though the second and fourth groups of cells are arranged in the same column. That is, the plurality of cells included in one group are connected to each other in parallel, and are connected with the plurality of cells of another group in series.

Figure 11:
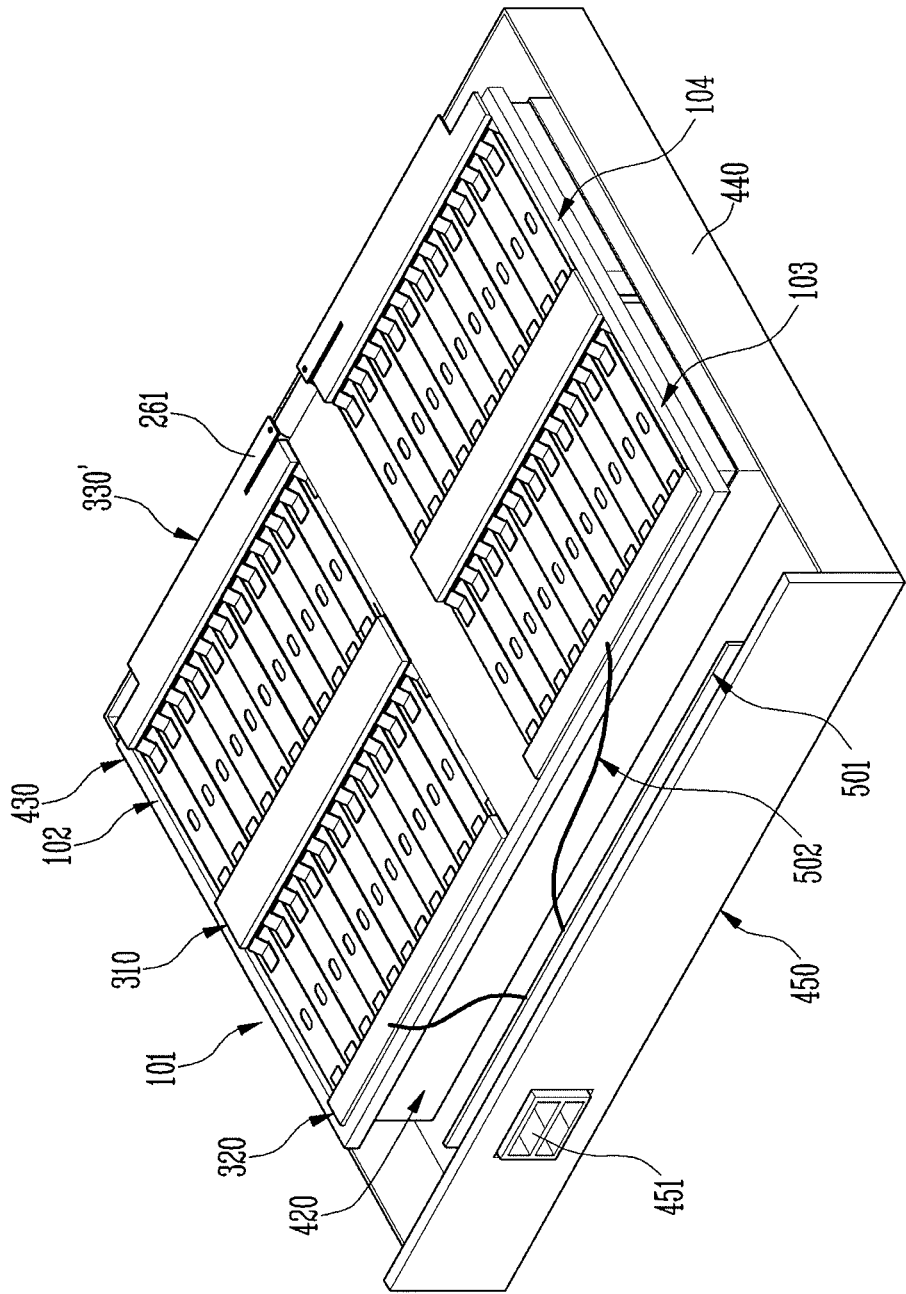
FIG. 11 illustrates a perspective view illustrating a battery pack according to yet another exemplary embodiment.

In the exemplary embodiment of FIG. 11, the first group 101 of cells and the second group 102 of cells are connected in series, and the plurality of cells in the first group of cells are connected to each other in parallel and the plurality of cells in the second group are connected to each other in parallel by the serial-parallel connection hybrid bus bar 310 as described in detail in the exemplary embodiment of FIG. 7. Similarly, the third group 103 of cells and the fourth group 104 of cells are connected in series, and the plurality of cells in the third group are connected to each other in parallel and the plurality of cells in the fourth group are connected to each other in parallel by the serial-parallel connection hybrid bus bar.

When the third group of cells is not sequentially disposed next to the second group of cells like the exemplary embodiment of FIG. 11, one of the pair of parallel connection hybrid bus bar may be modified and serve as the serial-parallel connection hybrid bus bar. The modified hybrid bus bar 330' illustrated in FIG. 11 has the similar shape to that of the parallel connection hybrid bus bar 330 of FIG. 7, but substantially connects the second group 102 of cells and the fourth group 104 of cells in series.

The modified hybrid bus bar 330' further includes a connection bar 261 further extending from the boundary of the parallel connection hybrid bus bar 330 of FIG. 7. The connection bar 261 may be a member further extending the reinforcement bar of the parallel connection hybrid bus bar 330, or a member extending in the same shape as the reinforcement bar and the body of the bus bar.

The modified hybrid bus bars 330' are provided at the second electrode terminal side of the second group 102 of cells and the first electrode terminal side of the fourth group 104 of cells, respectively, and are electrically connected with each other by a connection member to electrically connect the second group of cells and the fourth group of cells.

The first to fourth groups of cells are accommodated in the battery frame 420, and a frame cover 430 covering an opening of the battery frame 420 and spaced gaps of the first to fourth groups of cells is further provided. The parallel connection hybrid bus bar 320, the serial-parallel connection hybrid bus bar 310, and the modified hybrid bus bar 330' are installed on the frame cover 430 to be supported by the frame cover.

The battery housing 450 accommodates the battery frame in which the plurality of cells are connected in series and in parallel and accommodated and accommodates a control module 501 including a circuit controlling the plurality of cells. The battery housing 450 includes a housing frame 440 having a size and an internal space sufficient to accommodate both the battery frame 420 and the frame cover 430.

The control module 501 is installed between the internal surface of the housing frame 440 and the battery frame 420. The parallel connection hybrid bus bar 310 is electrically connected with the control module 501 by a wire 502 to control charging and discharging of the plurality of cells and to electrically connect the plurality of cells to an external device. The housing frame 440 includes a connector 451 electrically connected with the control module 501 to connect the plurality of cells to an external device.

The parallel connection bus bars 220 and 230 and the serial-parallel connection bus bar 210 of the exemplary embodiment of FIG. 1 may also be used in the exemplary embodiment of FIG. 11. In this case, the connection bar 261 of the modified hybrid bus bar 330' of FIG. 11 may be a member that extends the bus bar body of the parallel connection bus bar 230 of the exemplary embodiment of FIG. 1.

By way of summation and review, in order to implement a high output or high capacity secondary battery, a plurality of unit cells may be connected in series and/or in parallel. Further, a controller controlling charging and/or discharging of the secondary battery and preventing overcharging and/or overdischarging may be further included as necessary.

Exemplary embodiments are directed to a battery pack including a bus bar which flexibly responds to an external impact and has improved contact resistance. According to the exemplary embodiments, an external impact is absorbed by a bent portion of the bus bar, thereby improving durability of the battery pack. Further, contact resistance of the bus bar is decreased, thereby improving durability of the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a plurality of cells aligned in a first direction, each of the plurality of cells provided with first and second electrode terminals, and the first electrode terminals being exposed through first terminal surfaces of the plurality of cells, respectively; and
   at least one bus bar including:
      a bus bar body, a longitudinal direction of the bus bar body extending along the first direction, and
      a plurality of terminal connection tabs extending from the bus bar body to be electrically connected with the first electrode terminals of the plurality of cells, respectively,
   wherein the bus bar body is vertically spaced apart from tops of the plurality of cells, an empty space being defined between a bottom of the bus bar body and the tops of the plurality of cells,
   wherein the plurality of terminal connection tabs are bent at least one time with respect to a direction normal to bottoms of the plurality of cells in a region between the bus bar body and the first electrode terminals of the plurality of cells, the plurality of terminal connection tabs being bent at an oblique angle with respect to the bus bar body, and
   wherein each terminal connection tab of the plurality of terminal connection tabs includes an inclined surface that is inclined with respect to a surface of the bus bar body and with respect to a corresponding first terminal surface.

2. The battery pack as claimed in claim 1, wherein:
   the plurality of cells includes a first group of cells, the cells in the first group of cells being aligned in the first direction, and
   the at least one bus bar includes a parallel connection bus bar, the parallel connection bus bar including a plurality of the terminal connection tabs bent in a region extending to corresponding electrode terminals of the first group of cells, and the parallel connection bus bar connecting the cells in the first group of cells in parallel.

3. The battery pack as claimed in claim 1, wherein the plurality of cells includes:
   a first group of the plurality of cells, cells in the first group being aligned in the first direction; and
   a second group of the plurality of cells, cells in the second group being aligned in the first direction, and the first and second groups being aligned in a second direction perpendicular to the first direction,
   wherein the at least one bus bar includes a serial-parallel connection bus bar, the serial-parallel connection bus bar connecting the first group of the plurality of cells and the second group of the plurality of cells in series, the serial-parallel connection bus bar connecting cells within the first group of the plurality of cells in parallel, and the serial-parallel connection bus bar connecting cells within the second group of the plurality of cells in parallel.

4. The battery pack as claimed in claim 1, wherein the plurality of terminal connection tabs exhibit elasticity and extend from a boundary of the bus bar body toward a corresponding terminal surface of the plurality of cells.

5. The battery pack as claimed in claim 4, wherein the bus bar body is integrated with the plurality of terminal connection tabs.

6. The battery pack as claimed in claim 4, further comprising:
a reinforcement bar on the bus bar body and including a conductive material different from that of the bus bar body.

7. The battery pack as claimed in claim 6, wherein the at least one bus bar includes nickel, and the reinforcement bar includes aluminum.

8. The battery pack as claimed in claim 6, wherein the reinforcement bar extends in the first direction.

9. The battery pack as claimed in claim 6, wherein the reinforcement bar is welded to the bus bar body.

10. The battery pack as claimed in claim 1, wherein each one of the plurality of terminal connection tabs includes at least two segments connected to each other at a connection point, the at least two segments being bent with respect to each other at the connection point at a non-zero angle.

11. The battery pack as claimed in claim 10, wherein a first segment of the at least two segments is parallel to and overlaps a corresponding first electrode terminal, and a second segment of the at least two segments extends from the first segment to the bus bar body.

12. The battery pack as claimed in claim 1, wherein each one of the plurality of terminal connection tabs includes at least a first segment and a second segment connected to each other, the second segment being connected between the bus bar body and the first segment, and the second segment being bent with respect to each of the bus bar body and the first segment at a non-zero angle.

13. The battery pack as claimed in claim 12, wherein the second segment is bent with respect to the bus bar body at an oblique angle.

14. The battery pack as claimed in claim 1, wherein the plurality of terminal connection tabs are bent at least one time in a region other than a boundary between the bus bar body and the plurality of terminal connection tabs.

15. The battery pack as claimed in claim 1, wherein the plurality of cells includes:
a first group of the plurality of cells, cells in the first group being aligned in the first direction; and
a second group of the plurality of cells, cells in the second group being aligned in the first direction, and the first and second groups being aligned in a second direction perpendicular to the first direction,
wherein the at least one bus bar extends in the first direction between the first and second groups, a first group of the plurality of terminal connection tabs extending from the bus bar body toward the first group of the plurality of cells, and a second group of the plurality of terminal connection extending from the bus bar body toward the second group of the plurality of cells.

16. The battery pack as claimed in claim 1, wherein the bus bar body contacts the plurality of cells only via the plurality of terminal connection tabs.

17. The battery pack as claimed in claim 1, wherein the plurality of terminal connection tabs separates the bus bar body from the tops of the plurality of cells along a direction normal to bottoms of the plurality of cells.

18. The battery pack as claimed in claim 1, wherein the plurality of terminal connection tabs are completely separated and spaced apart from each other, the plurality of terminal connection tabs extending from two opposite sides of the bus bar body.

19. A battery pack, comprising:
a plurality of cells aligned in a first direction, each of the plurality of cells provided with first and second electrode terminals; and
at least one bus bar including a plurality of terminal connection tabs, the plurality of terminal connection tabs being electrically connected with the first electrode terminals of the plurality of cells, respectively,
wherein the plurality of terminal connection tabs are bent at least one time in a region extending to the first electrode terminals of the plurality of cells,
wherein the plurality of cells includes:
a first group of the plurality of cells, cells in the first group being aligned in the first direction, and
a second group of the plurality of cells, cells in the second group being aligned in the first direction, and the first and second groups being aligned in the first direction,
wherein the at least one bus bar includes a serial-parallel connection bus bar, the serial-parallel connection bus bar connecting the first group of the plurality of cells and the second group of the plurality of cells in series, the serial-parallel connection bus bar connecting cells within the first group of the plurality of cells in parallel, and the serial-parallel connection bus bar connecting cells within the second group of the plurality of cells in parallel, and
wherein the serial-parallel connection bus bar includes a plurality of the terminal connection tabs, the plurality of the terminal connection tabs including:
a plurality of first group terminal connection tabs bent in a region extending to corresponding second electrode terminals of the first group of the plurality of cells, and connected with corresponding second electrode terminals of the first group of the plurality of cells; and
a plurality of second group terminal connection tabs bent in a region extending to corresponding first electrode terminals of the second group of the plurality of cells, and connected with corresponding first electrode terminals of the second group of the plurality of cells.

20. The battery pack as claimed in claim 19, wherein the at least one bus bar further includes a parallel connection bus bar, which connects the first electrode terminals of the first group of the plurality of cells to each other or connects the second electrode terminals of the second group of the plurality of cells to each other.

* * * * *